(12) United States Patent
Thanikachalam

(10) Patent No.: US 9,166,667 B2
(45) Date of Patent: Oct. 20, 2015

(54) ANTENNA SELECTION DIVERSITY SCHEME FOR ZIGBEE OR OTHER WIRELESS DEVICES AND RELATED APPARATUS AND METHOD

(75) Inventor: Guhapriyan Thanikachalam, TamilNadu (IN)

(73) Assignee: Honeywell International Inc., Morristown, NJ (US)

( * ) Notice: Subject to any disclaimer, the term of this patent is extended or adjusted under 35 U.S.C. 154(b) by 715 days.

(21) Appl. No.: 13/271,943

(22) Filed: Oct. 12, 2011

(65) Prior Publication Data

US 2013/0094422 A1   Apr. 18, 2013

(51) Int. Cl.
  *H04W 4/00*   (2009.01)
  *H04B 7/06*   (2006.01)
  *H04W 40/24*   (2009.01)

(52) U.S. Cl.
  CPC .............. *H04B 7/0691* (2013.01); *H04W 40/24* (2013.01)

(58) Field of Classification Search
  CPC ..... H04B 7/0408; H04B 7/028; H04B 7/0404
  USPC ......................................... 370/334
  See application file for complete search history.

(56) References Cited

U.S. PATENT DOCUMENTS

| | | | |
|---|---|---|---|
| 5,952,963 A | 9/1999 | Shen et al. | |
| 6,018,555 A | 1/2000 | Mahany | |
| 6,085,076 A | 7/2000 | Lindsay et al. | |
| 6,757,267 B1 | 6/2004 | Evans et al. | |
| 6,931,081 B2 | 8/2005 | Meijer et al. | |
| 7,079,809 B1 | 7/2006 | Scherzer | |
| 7,146,134 B2 | 12/2006 | Moon et al. | |
| 7,515,940 B2 | 4/2009 | Chen et al. | |
| 7,610,019 B2 | 10/2009 | Moon et al. | |
| 7,660,559 B2 | 2/2010 | Herscovich et al. | |
| 8,340,067 B2 * | 12/2012 | Buga et al. | 370/338 |
| 8,526,515 B2 | 9/2013 | Calando et al. | |
| 2002/0164963 A1 * | 11/2002 | Tehrani et al. | 455/101 |

(Continued)

FOREIGN PATENT DOCUMENTS

WO    WO 2010/138735 A1   12/2010

OTHER PUBLICATIONS

M.A. Do, et al., "Hybrid diversity combining techniques for DS-CDMA over a multipath fading channel", Wireless Networks 3 (1997), p. 155-158.

(Continued)

*Primary Examiner* — Shaq Taha

(57) ABSTRACT

A method includes identifying, at a wireless device, transmit and receive link costs respectively associated with transmitting data to and receiving data from one or more neighboring nodes of the wireless device. The method also includes selecting at least one of multiple antennas to be used to further communicate with the neighboring node(s). The at least one antenna is selected using the link costs. At least some of the link costs are identified using link status messages received from the neighboring node(s). For each neighboring node, one antenna can be selected as a unicast antenna for unicast communications with that neighboring node. Also, one antenna can be selected as a broadcast/multicast antenna for broadcast or multicast communications with multiple neighboring nodes. An identity of the at least one antenna selected to communicate with the neighboring node(s) may not be communicated from the wireless device.

24 Claims, 9 Drawing Sheets

(56) References Cited

U.S. PATENT DOCUMENTS

| | | | |
|---|---|---|---|
| 2004/0156339 | A1 | 8/2004 | Urquhart et al. |
| 2005/0221837 | A1* | 10/2005 | Cha et al. .................... 455/452.2 |
| 2006/0025178 | A1* | 2/2006 | Tao et al. .................... 455/562.1 |
| 2007/0200773 | A1 | 8/2007 | Dou et al. |
| 2008/0080455 | A1 | 4/2008 | Rofougaran |
| 2008/0232258 | A1* | 9/2008 | Larsson et al. ................ 370/238 |
| 2009/0316807 | A1 | 12/2009 | Kim et al. |
| 2010/0054512 | A1 | 3/2010 | Solum |
| 2010/0091891 | A1 | 4/2010 | Calando et al. |
| 2010/0246489 | A1* | 9/2010 | Yang et al. .................... 370/328 |
| 2010/0296552 | A1 | 11/2010 | Budampati et al. |
| 2011/0086671 | A1 | 4/2011 | Catreux-Erceg et al. |
| 2012/0294162 | A1* | 11/2012 | Pajukoski et al. ............. 370/252 |

OTHER PUBLICATIONS

M. Oguz Sunay, et al., "Diversity Combining for DS CDMA Systems with Synchronization Errors", 1996 IEEE, p. 83-89.

Deepti Singh, et al., "Analysis of Rake Reception with MRC and Imperfect Weight Estimation for Binary Coherent Orthogonal Signaling", 5 pages.

Ning Kong, et al., "A Selection Combining Scheme for Rake Receivers", 1995 IEEE, p. 426-430.

S.A. Allpress, et al., "A Comparison of Maximal Ratio and Equal Gain Diversity Combining in Direct Sequence CDMA Future Mobile Communication Networks", Apr.-Dec. 1990, 5 pages.

Ozgur Ertug, "On the Impact of Diversity Combining Schemes to the Performance of RAKE Receivers over GWSSUS Fading Channels", 4 pages.

Mohamed-Slim Alouini, et al., "RAKE Reception with Maximal-Ratio and Equal-Gain Combining for DS-CDMA Systems in Nakagami Fading", 5 pages.

Junseok Kim, et al., "Interference-aware Geographical Routing for Sensor-nets in Indoor Environments", 2009, 5 pages.

* cited by examiner

ANTENNA SELECTION DIVERSITY SCHEME FOR ZIGBEE OR OTHER WIRELESS DEVICES AND RELATED APPARATUS AND METHOD

TECHNICAL FIELD

This disclosure relates generally to wireless communications. More specifically, this disclosure relates to an antenna selection diversity scheme for ZigBee or other wireless devices and related apparatus and method.

BACKGROUND

Wireless devices often do not have equal range in all directions. This is typically due to the anisotropy of the antennas used by the wireless devices. Anisotropy means that a feature is directionally dependent or non-uniform in all directions. In other words, an antenna is able to transmit or receive data at longer distances in some directions and at shorter distances in other directions.

Poor performance of a radio in indoor and industrial environments can be caused by various factors, some of which are corrected using different techniques. For example, shadow fading is caused by obstacles between a transmitter and a receiver. Spacing two or more antennas far apart from each other and using a diversity technique can help reduce shadow fading. Fading because of destructive interference can be reduced using two or more antennas deployed at a quarter wavelength distance along with a diversity technique. A null in an antenna limits the antenna's range in the direction of the null. This can be handled by deploying another antenna that has better gain in the direction of the null and using a diversity technique. Signal attenuation at an antenna can be caused by mismatched polarization, which can be reduced using multiple antennas at opposite polarizations (such as orthogonal polarizations with a linear antenna) along with a diversity technique. Fading caused by multipath interference can be reduced using a directional antenna or an antenna array with beam steering.

As can be seen here, deploying multiple antennas can help reduce many problems associated with wireless communications. However, some of these techniques have opposing requirements (such as far separation versus quarter wavelength separation). As a result, there are multiple ways to utilize two or more antennas to provide antenna diversity.

ZigBee devices are wireless devices that operate according to the ZigBee standard, which is a low-power wireless networking standard. In addition to the above problems with antenna performance, the ZigBee standard places an artificial limitation on devices by limiting when one device can communicate with another device. More specifically, a "child" node typically joins an existing ZigBee network through a "parent" node, and the ZigBee standard defines a "link cost" associated with a link between the child and parent nodes. The link cost is associated with the probability that a message from the child node will be successfully received by the parent node, where a lower cost indicates a higher likelihood of success. The ZigBee standard requires that the link cost be less than or equal to a value of three before allowing a child node to join or rejoin a network through a particular parent node. As a result, poor wireless link qualities caused by any of the various problems noted above can limit link costs, reducing or even preventing ZigBee devices from joining or rejoining a network.

SUMMARY

This disclosure provides an antenna selection diversity scheme for ZigBee or other wireless devices and related apparatus and method.

In a first embodiment, a method includes identifying, at a wireless device, transmit and receive link costs respectively associated with transmitting data to and receiving data from one or more neighboring nodes of the wireless device. The method also includes selecting at least one of multiple antennas to be used to further communicate with the one or more neighboring nodes. The at least one antenna is selected using the transmit and receive link costs, and at least some of the transmit and receive link costs are identified using link status messages received from the one or more neighboring nodes.

In a second embodiment, an apparatus includes multiple antennas and a wireless radio configured to transmit data to and receive data from one or more neighboring nodes using the antennas. The apparatus also includes a controller configured to (i) identify transmit and receive link costs respectively associated with transmitting the data to and receiving the data from the one or more neighboring nodes and (ii) select at least one of the antennas to be used to further communicate with the one or more neighboring nodes. The controller is configured to select the at least one antenna using the transmit and receive link costs. The controller is configured to identify at least some of the transmit and receive link costs using link status messages from the one or more neighboring nodes.

In a third embodiment, a computer readable medium embodies a computer program. The computer program includes computer readable program code for identifying, at a wireless device, transmit and receive link costs respectively associated with transmitting data to and receiving data from one or more neighboring nodes of the wireless device. The computer program also includes computer readable program code for selecting at least one of multiple antennas to be used to further communicate with the one or more neighboring nodes. The computer readable program code for selecting the at least one antenna includes computer readable program code for selecting the at least one antenna using the transmit and receive link costs. The computer readable program code for identifying the transmit and receive link costs includes computer readable program code for identifying at least some of the transmit and receive link costs using link status messages from the one or more neighboring nodes.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
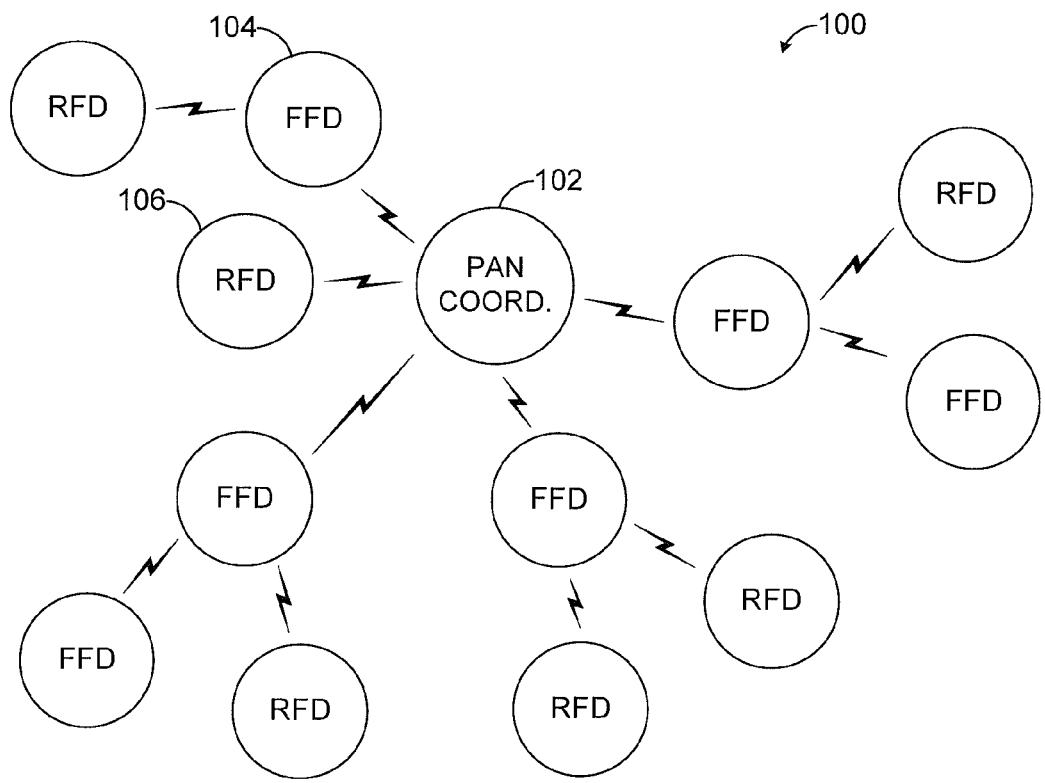
FIG. 1 illustrates an example wireless network according to this disclosure.

FIG. 1 illustrates an example wireless network 100 according to this disclosure. In this particular embodiment, the network 100 represents a ZigBee network containing a number of wireless ZigBee devices 102-106. In general, the ZigBee devices 102-106 form a personal area network (PAN). The network 100 here includes one PAN coordinator 102 and various full function devices (FFDs) 104 and reduced function devices (RFDs) 106. The PAN coordinator 102 represents the ZigBee device responsible for creating the personal area network, such as by choosing a PAN identifier and allowing other devices to join the PAN. The FFDs 104 represent ZigBee devices that can route data messages within the PAN during normal operation. The FFDs 104 are therefore often referred to as ZigBee routers. The RFDs 106 represent ZigBee devices that do not route data messages. Rather, each RFD 106 represents an endpoint device that transmits data messages generated by that RFD 106 and receives data messages destined for that RFD 106, but the RFD 106 does not receive and forward data messages destined for other devices. Note that the PAN coordinator 102 represents an FFD, but it is the FFD that created the PAN.

Each of the devices in FIG. 1 could implement any suitable functionality in addition to wireless communications. For example, one or more of these devices could represent wireless sensors, actuators, or controllers in an industrial control and automation system.

The PAN coordinator 102 and the FFDs 104 form a wireless network by establishing links between themselves and with the RFDs 106. The network 100 can have any suitable configuration depending on the nodes in the network. For example, the network 100 in FIG. 1 has a cluster tree topology, where clusters of nodes each arranged in a tree hierarchy communicate with the PAN coordinator 102. However, other topologies could be used. For instance, the nodes could be arranged in a star topology, where the FFDs 104 and RFDs 106 communicate directly with the PAN coordinator 102 (without any intermediate node). The nodes could also form a mesh or peer-to-peer network, where the nodes form wireless links to whatever neighboring nodes are available and satisfy certain criteria (such as suitable link costs as described above). Note that any other topology can be used here.

As described in more detail below, at least one node in the wireless network 100 supports an antenna diversity scheme involving the use of multiple antennas. The antennas can be used to provide reliable communications and a reasonable guaranteed range, and the appropriate antennas can be selected for communications with other nodes. This approach could even provide longer ranges and more reliable link qualities for all links of all nodes implementing this technique. This approach does not require the use of costly hardware or complex software since only multiple antennas and antenna switches may be needed along with various software routines. This approach can eliminate user intervention and can automatically modify antenna selections as changes occur in the network 100 (such as changed channel conditions or radio locations). In addition, this approach may not require the use of extra data messages, so there is little if any impact on network throughput or expandability of the network 100.

Additional details regarding the use of this antenna diversity scheme are provided below. While often described as being used with ZigBee devices, the same or similar approach could be used with other wireless devices. In general, this antenna diversity scheme can be used with any wireless protocol that supports the transmission of link status or other messages containing link quality, link cost, or similar content as part of the normal operation of the wireless devices in a network.

Although FIG. 1 illustrates one example of a wireless network 100, various changes may be made to FIG. 1. For example, as noted above, FIG. 1 illustrates one example operational environment where the antenna diversity scheme described below could be used. The antenna diversity scheme could be used in any other suitable network.

Figure 2:
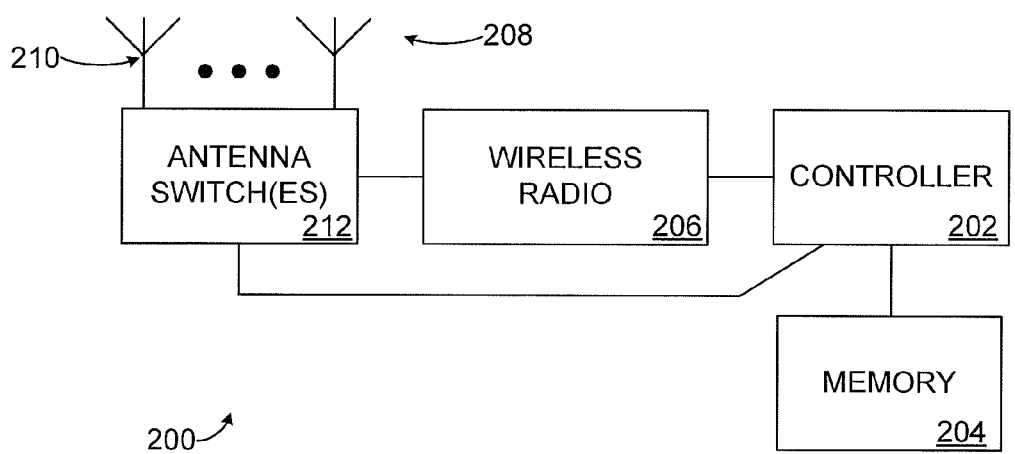
FIG. 2 illustrates an example wireless device supporting antenna diversity according to this disclosure.

FIG. 2 illustrates an example wireless device 200 supporting antenna diversity according to this disclosure. In some embodiments, the wireless device 200 represents a ZigBee wireless device, such as a PAN coordinator 102, FFD 104, or RFD 106.

As shown in FIG. 2, the wireless device 200 includes a controller 202, which controls the overall operation of the wireless device 200. For example, the controller 202 may obtain data to be transmitted externally, and the controller 202 could provide the data to one or more other components in the wireless device 200 for transmission. The controller 202 could also receive data over a wireless network and use or pass on the data.

As particular examples, the controller 202 in a PAN coordinator 102 could control interaction with other nodes to form a personal area network. The controller 202 in a PAN coordinator 102 or FFD 104 could also support the routing of data messages through the personal area network. The controller 202 in a PAN coordinator 102, FFD 104, or RFD 106 could further generate data messages for wireless transmission or process received data messages. In addition, as described below, the controller 202 in a PAN coordinator 102, FFD 104, or RFD 106 can perform antenna diversity operations to select the best antennas to be used to communicate with other nodes in a wireless network.

The controller 202 includes any suitable structure for controlling the operation of a wireless device 200. For example, the controller 202 could represent a processor, microprocessor, microcontroller, field programmable gate array (FPGA), application specific integrated circuit (ASIC), or other processing or control device.

A memory 204 is coupled to the controller 202. The memory 204 stores any of a wide variety of information used, collected, or generated by the wireless device 200. For example, the memory 204 can store information identifying the antennas to be used to communicate with neighboring nodes. The memory 204 could also store software or firmware instructions executed by the controller 202. The memory 204 includes any suitable volatile and/or non-volatile storage and retrieval device(s).

A wireless radio 206 is coupled to an antenna bank 208 containing multiple antennas 210 via one or more antenna switches 212. The wireless radio 206 and antennas 210 are used by the wireless device 200 to communicate wirelessly with other devices. For example, a PAN coordinator 102 or FFD 104 can use the wireless radio 206 and antennas 210 to route data messages in a PAN. Also, a PAN coordinator 102, FFD 104, or RFD 106 can use the wireless radio 206 and antennas 210 to transmit data messages generated by that device or to receive data messages destined for that device. The wireless radio 206 includes any suitable structure for generating signals to be transmitted wirelessly and/or receiving signals received wirelessly. In some embodiments, the wireless radio 206 includes an RF transceiver. Also, the antenna bank 208 includes at least two antennas 210, and each antenna 210 could represent an RF antenna (although any other suitable wireless signals could be used to communicate). Note that different antennas 210 could represent the same type of antenna or different types of antennas.

The one or more antenna switches 212 are used to couple different antennas 210 to the wireless radio 206. For example, if the controller 202 determines that communication with a specific neighboring node is needed, the antenna switches 212 can couple a specific antenna 210 to the wireless radio 206 for use as a unicast antenna. Different antennas 210 can be used as unicast antennas for different devices. Also, one of the antennas 210 can be selected for use during broadcast/multicast transmissions. In addition, various procedures described below can be used to examine and change the antennas selected as the unicast, broadcast, and multicast antennas. The antenna switch(es) 212 include(s) any suitable structure for selectively coupling different antennas to a wireless radio.

While multiple diversity schemes are available to select an antenna for point-to-point links, they are often not suited for use in mesh networks or by a PAN coordinator in topologies such as a star topology. Also, radio chips with built-in diversity often rely on toggling antennas during preamble reception to identify the best antenna. This typically provides only receive diversity and supports a limited number of antennas (often only two antennas). In addition, diversity techniques involving multiple radios tend to be more costly and consume more power, and most of them do not provide transmit diversity.

In the wireless device 200 of FIG. 2, the controller 202 implements algorithms for identifying which antennas 210 to use when communicating with neighboring nodes. In a ZigBee network, information in link status messages transmitted as part of the ZigBee network layer can be used to select the antennas 210 to be used to communicate with each neighboring node without any explicit exchange of information regarding the antenna selection. This approach provides both transmit diversity and limited receive diversity regardless of network topology (the receive diversity can be limited since there may be instances when a receiver does not know which neighboring node is going to transmit next). Moreover, the algorithms can be implemented using a very small software/firmware footprint, and one device can benefit without requiring other devices to use multiple antennas or the algorithms. The logic can be very simple and easy to implement, and no extra hardware costs may be needed beyond multiple antennas 210 and switch(es) 212. In addition, this does not require the transmission of any extra data messages to communicate diversity information, which reduces network loading (important for bandwidth-constrained systems). This means that no messages need to be sent identifying which antenna is selected for communicating with a specified neighbor.

Figure 3:
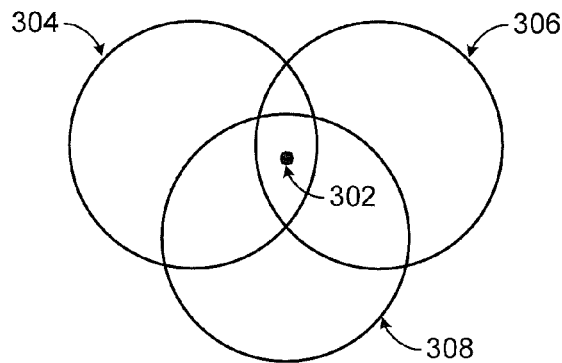
FIG. 3 illustrates example communication ranges for a wireless device supporting antenna diversity according to this disclosure.

An example of the benefits obtained using antenna diversity are shown in FIG. 3, which illustrates example communication ranges for a wireless device supporting antenna diversity according to this disclosure. In this example, a point 302 denotes a current location of a wireless device 200. Also, areas 304-308 denote the possible wireless coverage areas using three different antennas 210. As can be seen here, allowing the wireless device 200 to select which antenna 210 to use for communicating with different neighboring nodes provides a much larger coverage area for the wireless device 200.

Although FIG. 2 illustrates one example of a wireless device 200 supporting antenna diversity, various changes may be made to FIG. 2. For example, various components in FIG. 2 could be combined, subdivided, or omitted and additional components could be added according to particular needs. Although FIG. 3 illustrates examples of communication ranges for a wireless device 200 supporting antenna diversity, various changes may be made to FIG. 3. For instance, the size(s), shape(s), and number of coverage areas (and therefore antennas) are for illustration only.

Figure 4:
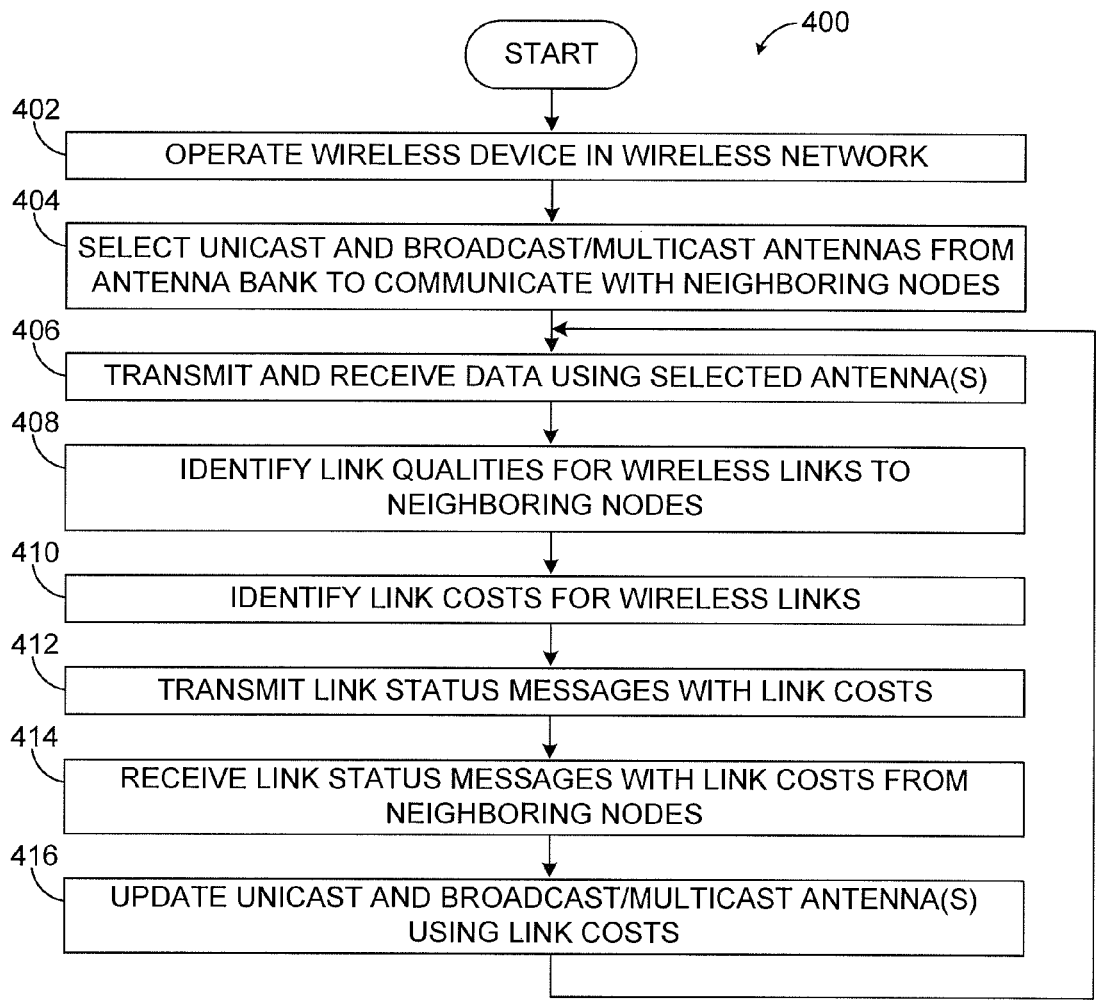
FIG. 4 illustrates an example method for antenna selection diversity in a wireless device according to this disclosure.

FIG. 4 illustrates an example method 400 for antenna selection diversity in a wireless device according to this disclosure. The following discussion assumes that a wireless device 200 performs the method 400, and other devices within range of that wireless device 200 are called neighboring nodes. While the method 400 is described below as being performed by the wireless device 200, the same or similar method could be used by any other wireless device using any suitable protocol.

As shown in FIG. 4, a wireless device is operated in a wireless network at step 402. During this time, the wireless device selects unicast and broadcast/multicast antennas from an antenna bank for communicating with neighboring nodes at step 404. This could include, for example, the controller 202 selecting an antenna 210 to be used as a unicast antenna for communicating with each neighboring node, where different neighboring nodes can be associated with different unicast antennas. This could also include the controller 202 selecting an antenna 210 to be used as a broadcast/multicast antenna for communicating with multiple neighboring nodes. Data is transmitted and/or received using the selected antenna(s) at step 406.

The wireless device identifies a link quality for each wireless link to a neighboring node at step 408 and a link cost for each wireless link at step 410. The link quality for an outgoing wireless channel can be measured by a receiving node and returned to the wireless device 200 as part of a link status message. The link quality for an incoming wireless channel can be measured by the wireless device 200 based on any suitable criteria (such as receive signal strength). The link costs for the wireless links can be based on the identified link qualities, such as pursuant to the ZigBee standard.

Link costs are sent from the wireless device to neighboring nodes as part of link status messages at step 412. Link costs calculated by neighboring nodes are received at the wireless device as part of link status messages at step 414. The link status messages can be formatted and sent as defined in the ZigBee standard. At least one unicast antenna for at least one neighboring node and/or a broadcast or multicast antenna can be updated using the link costs at step 416. This could include, for example, the controller 202 using the link costs to select the best antennas 210 for communicating with the neighboring nodes in both unicast and broadcast/multicast fashion. The method 400 then returns to step 406 to use the updated antenna(s).

In this way, information from link status messages transmitted by neighboring nodes is incorporated into the antenna diversity scheme. Each link status message could contain a neighbor list of the node transmitting the message (a listing of all nodes visible to the transmitting node), along with transmit and receive costs for each node in the neighbor list. The receive cost (as identified by a first node for receptions from a second node) can be based on the link quality during receipt of one or more most recent data messages received by the first node from the second node. The transmit cost (as identified by a first node for transmissions to a second node) can be based on the receive link quality as measured by the second node and contained in a link status message received from the second node at the first node. This approach allows each wireless device to (i) select the best unicast antenna for transmissions to each neighbor and (ii) select the antenna that best covers its neighbors for broadcast/multicast transmissions and for receptions from unexpected sources.

In some embodiments, this approach separately keeps track of the link quality of both transmissions and receptions for each neighbor, and it uses an internal mechanism to detect specific link information without explicitly transmitting such information. As such, when changes occur, the antenna selection can also change dynamically. Moreover, this approach does not require any additional messages to be transmitted and is fully compatible with ZigBee and other protocols that transmit link status messages or similar messages. For instance, this approach could be applicable to any protocol in which nodes communicate transmit and receive link qualities of neighboring nodes (whether periodically or based on events). In protocols that do not communicate transmit and/or receive link qualities of neighboring nodes, this could still be accomplished by generating custom messages (although this may increase network loading).

Although FIG. 4 illustrates one example of a method 400 for antenna selection diversity in a wireless device, various changes may be made to FIG. 4. For example, while shown as a series of steps, various steps in FIG. 4 could overlap, occur in parallel, occur in a different order, or occur multiple times.

FIGS. 5A through 9 illustrate example methods for antenna selection diversity in a wireless ZigBee device according to this disclosure. It is assumed here that various ZigBee devices are using an antenna selection diversity scheme for communications. However, the same or similar processes could be used with other types of wireless devices. Moreover, the following discussion assumes that a wireless device 200 performs the processes, and other devices within range of that wireless device 200 are called neighboring nodes.

In some embodiments, each device/node in the network 100 can use multiple instances of a link quality data structure. For each antenna 210, each neighboring node identified by a device 200 using that antenna 210 could be associated in the device 200 with an instance of a data structure having the following elements:

the neighboring node's address or other unique identifier;
data fields containing a transmit cost for sending data to that neighboring node, a receive link quality of message(s) received from that neighboring node, and a length of time that an antenna has been used as the unicast antenna for that neighboring node;
data fields containing a transmit cost for broadcast/multicast transmissions to that neighboring node, a receive link quality for broadcast/multicast transmissions from that neighboring node, and a length of time that an antenna has been used as a broadcast/multicast antenna for that neighboring node;
a transmit broadcast/multicast flag;
a receive broadcast/multicast flag or counter;
an experimental antenna flag;
a selected unicast antenna for that neighboring node;
a total number of data messages transmitted to that neighboring node (optional); and
a number of data messages transmitted to that neighboring node in the last X time windows (optional).

Figure 5A:
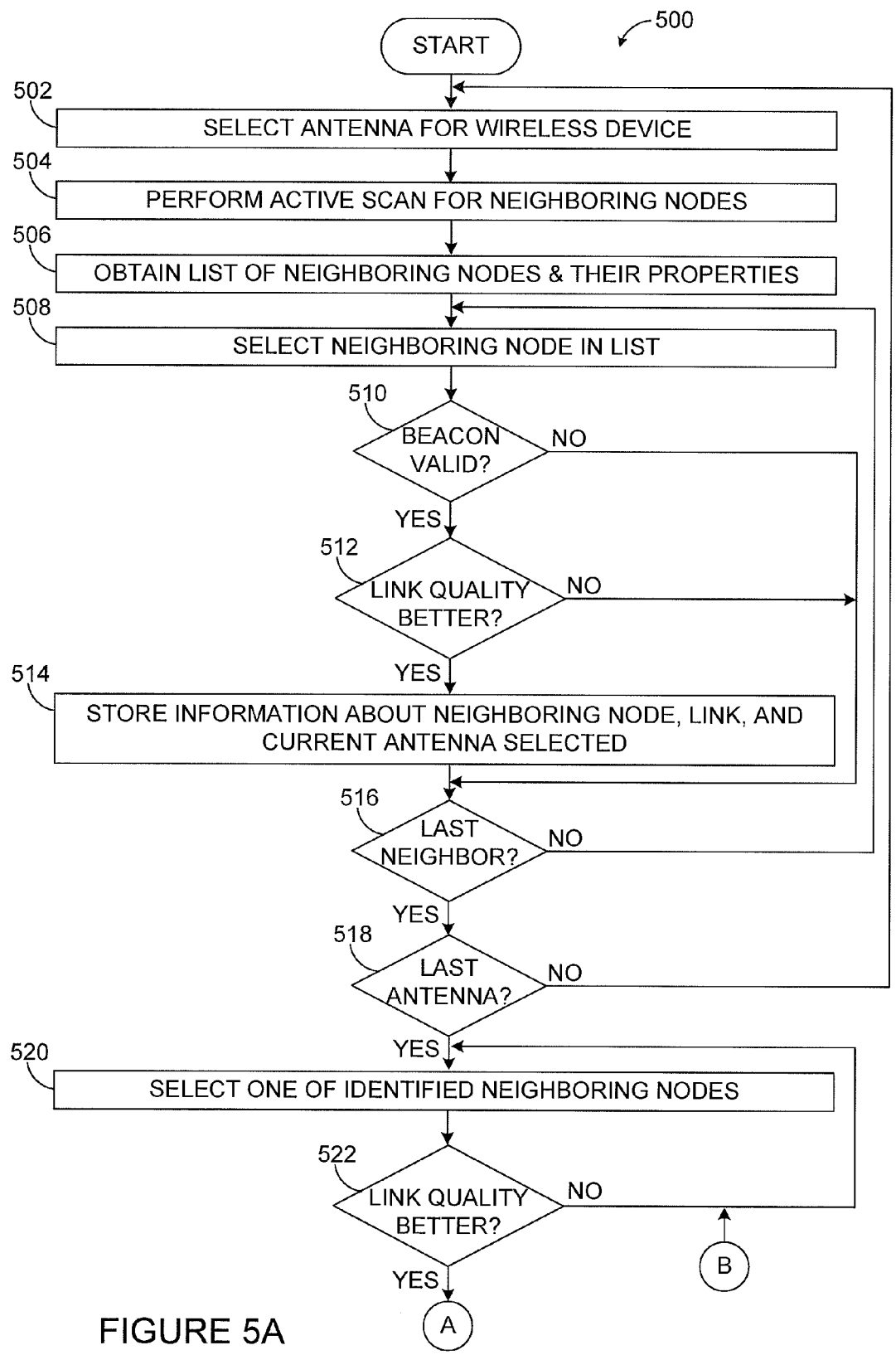
FIGS. 5A through 9 illustrate example methods for antenna selection diversity in a wireless ZigBee device according to this disclosure.
Figure 5B:
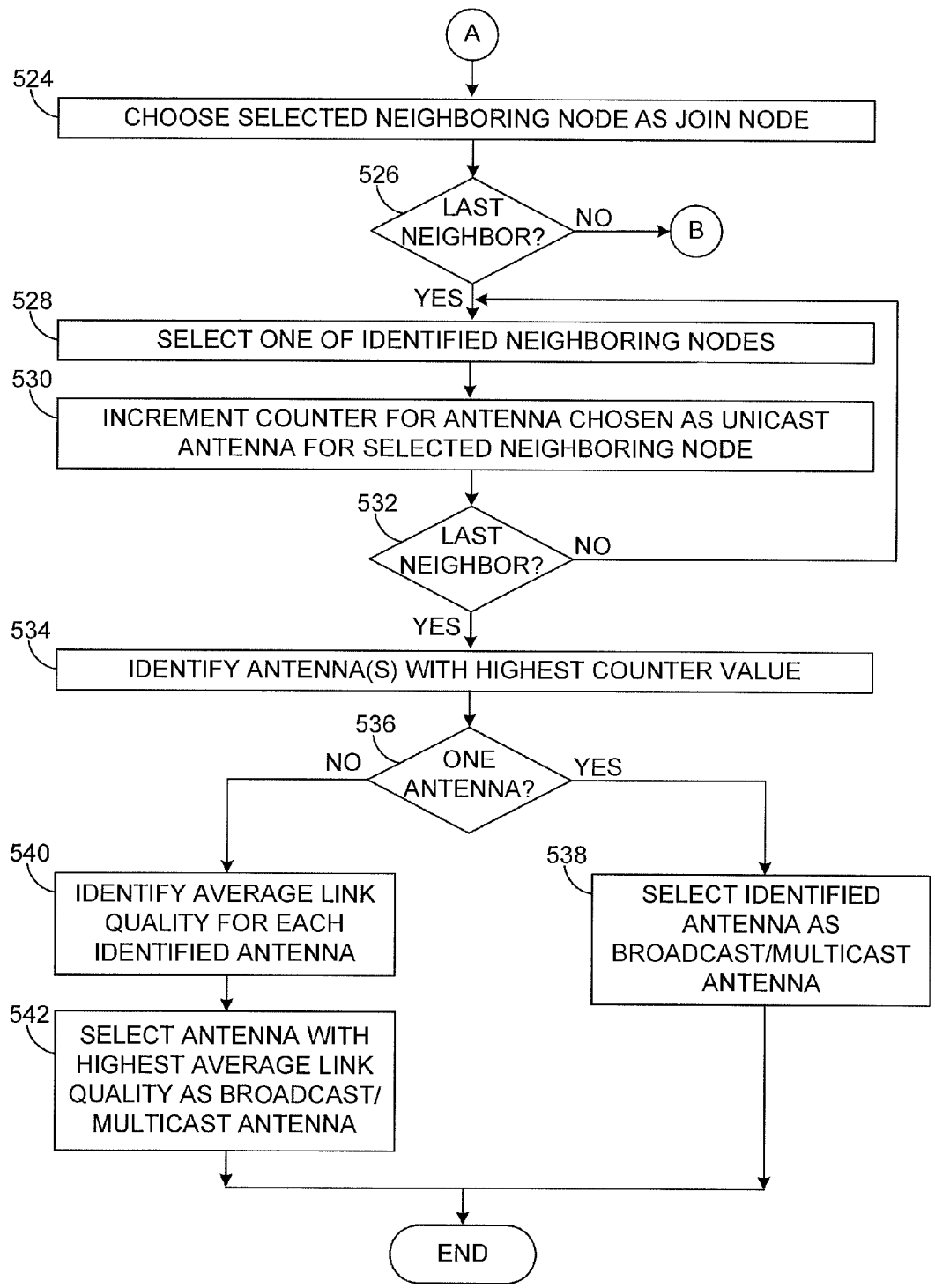

FIGS. 5A and 5B illustrate an example method 500 for active scanning to support antenna diversity in non-PAN coordinator devices. In other words, the method 500 could be used by FFDs 104 and RFDs 106. FIG. 5A generally includes three broad steps, namely the identification of a unicast antenna for each neighboring node, the selection of a join node, and the identification of a broadcast/multicast antenna. As noted above, a join node represents the parent node to be used by the wireless device 200. Assume in the following discussion that the wireless device 200 includes N antennas 210 in its antenna bank 208.

As shown in FIG. 5A, to identify a unicast antenna for each neighboring node, a wireless device selects one of the antennas in its antenna bank at step 502. This could include, for example, the controller 202 selecting one of the N antennas 210 using the antenna switches 212. An active scan for neighboring nodes is performed using the selected antenna at step 504. This could include, for example, the controller 202 using the selected antenna 210 to look for beacon signals from neighboring nodes. A list of identified neighboring nodes and their properties is obtained at step 506. This could include, for example, the controller 202 generating a list of all neighboring nodes from which a beacon signal is received, along with information like their link qualities.

One neighboring node in the list is selected at step 508, and a determination is made whether its beacon signal is valid at step 510. This could include, for example, the controller 202 verifying whether the beacon signal from the selected neighboring node contains an appropriate PAN identifier. If so, a determination is made whether the receive link quality for the link to the selected neighboring node is better using the selected antenna than using a prior antenna at step 512. Note that during the first iteration, the selected antenna is treated as having a better link quality since there is no prior antenna for comparison. If the receive link quality is better using the selected antenna than using a prior antenna, this indicates that the selected antenna is better for use as a unicast antenna to the selected neighboring node. Information about the selected neighboring node, the wireless link, and the current unicast antenna selected is stored at step 514. This could include, for example, storing the selected neighboring node's address, the receive link quality, and the selected antenna in the data structure described above.

A decision is made whether any more neighboring nodes remain to be selected from the list at step 516. If so, the process returns to step 508 to select another neighboring node in the list. If not, a decision is made whether any more antennas remain to be selected from the antenna bank at step 518. If so, the process returns to step 502 to select another antenna 210 in the antenna bank 208. The end result here is that each of the N antennas is used to scan for neighboring nodes, and the antenna with the best link quality is selected as the unicast antenna for communicating with each neighboring node.

The wireless device 200 next selects a join node. As shown in FIGS. 5A and 5B, the wireless device selects one of the neighboring nodes identified earlier at step 520. Any suitable criteria could be used to select one of the identified neighboring nodes, such as lowest address or other device identifier. A decision is made whether the selected neighboring node's link quality is better than a previously-selected join node's link quality at step 522 and, if so, the selected neighboring node is chosen as a new join node at step 524. A decision is made whether more identified neighboring nodes remain to be selected at step 526, and if so the process returns to step 520. During the first iteration here, the first selected neighboring node can be automatically selected as the join node. During each subsequent iteration, the join node is replaced by the selected neighboring node if the selected neighboring node's link quality is better. Effectively, the wireless device 200 selects the neighboring node with the best link quality as its join or parent node.

The wireless device 200 then selects its broadcast/multicast antenna. As shown in FIG. 5B, the wireless device selects one of the identified neighboring nodes at step 528 and increments a counter associated with that neighboring node's unicast antenna at step 530. A determination is made whether more neighboring nodes remain to be selected at step 532, and if so the process returns to step 528. The wireless device then determines which antenna or antennas have the highest counter value at step 534. If a single antenna has the highest counter value at step 536, that antenna is selected as the wireless device's broadcast/multicast antenna at step 538. If multiple antennas share the same highest counter value, an average link quality for each of these antennas is identified at step 540, and the antenna with the highest average link quality is selected as the wireless device's broadcast/multicast antenna at step 542. Effectively, the wireless device 200 identifies the antenna or antennas 210 that were selected as the unicast antenna for the largest number of neighboring nodes, and one of those antennas 210 is chosen as the broadcast/multicast antenna.

Note that while average link quality is used in steps 540-542 to break a tie between antennas having the same counter value, other approaches could be used. For example, if cluster tree routing is used in the network 100, it might be appropriate to choose an antenna that has the smallest receive signal strength indicator (RSSI) value while still having a link cost less than or equal to three. If multiple antennas 210 have the same RSSI value and a link cost less than or equal to three, the average link quality could then be used to select one of the antennas.

Figure 6A:
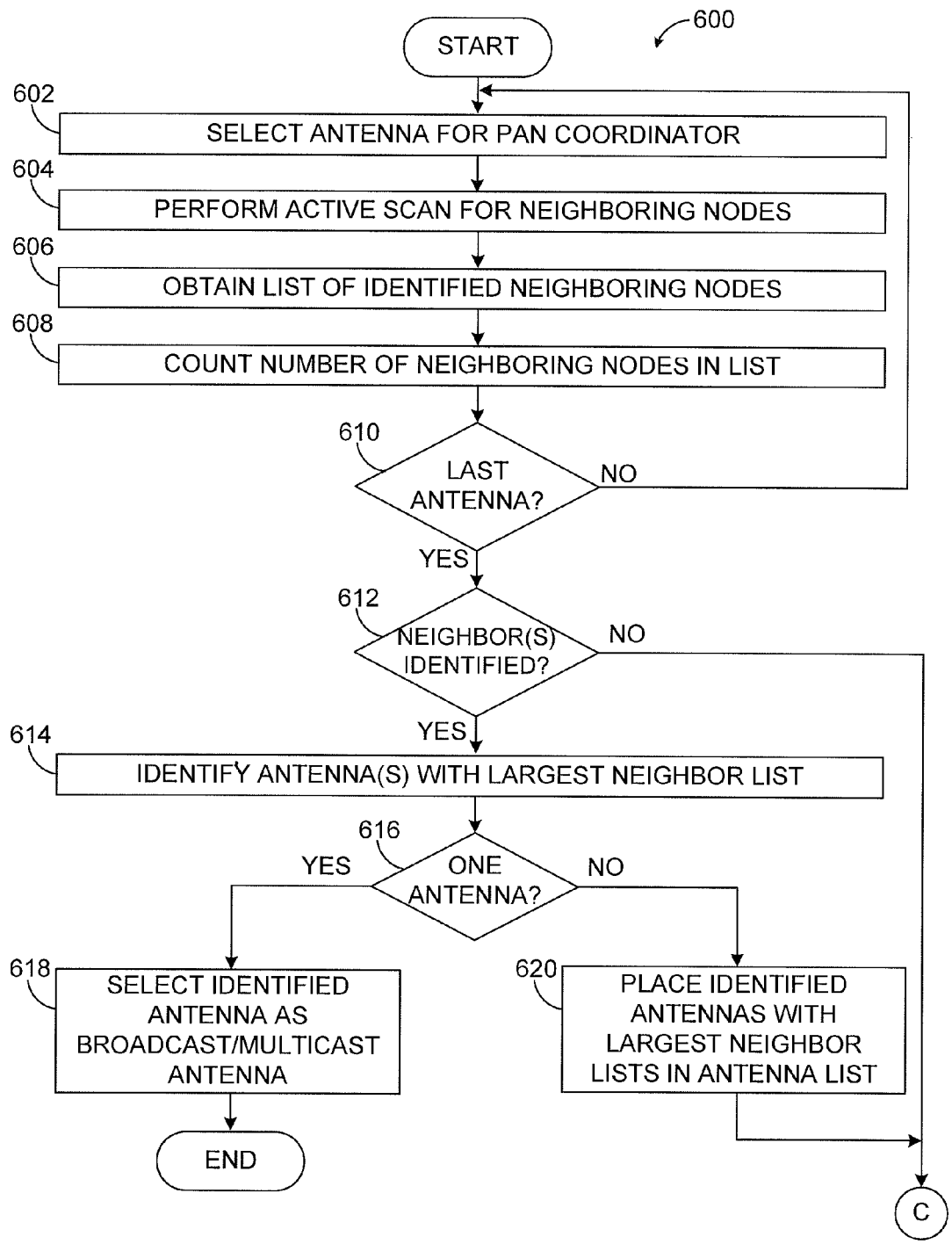
Figure 6B:
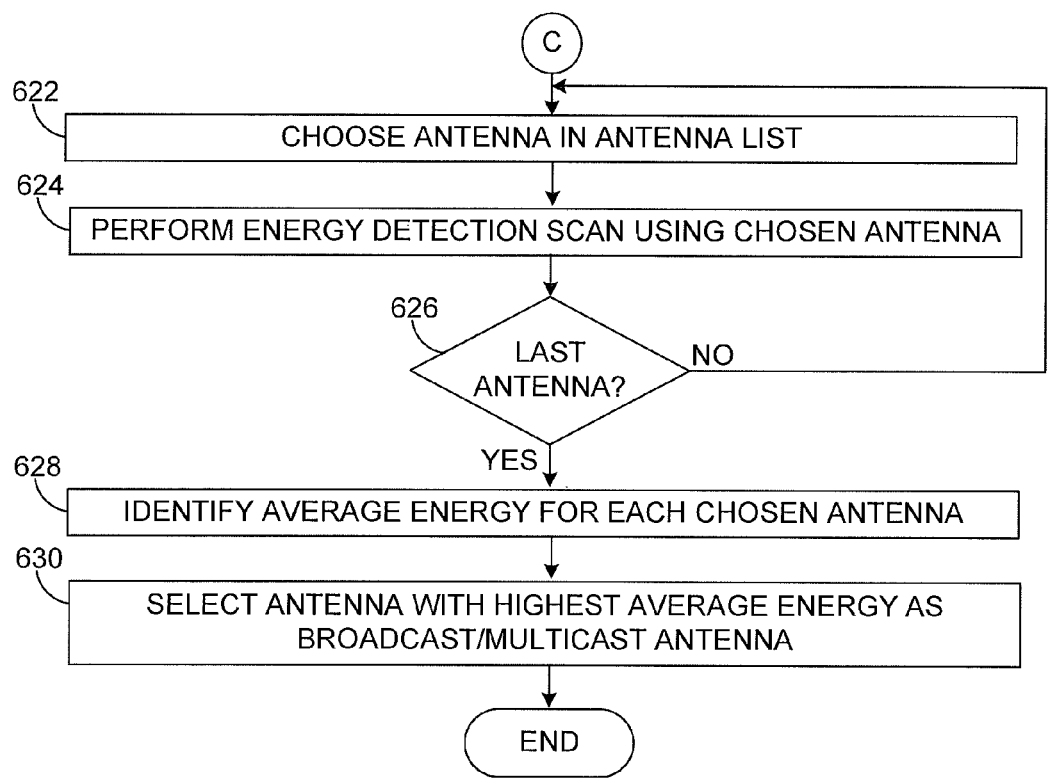

FIGS. 6A and 6B illustrate an example method 600 for selecting an antenna to serve as a broadcast/multicast antenna for a PAN coordinator. Again, assume that the wireless device 200 acting as a PAN coordinator has N antennas 210. As shown in FIG. 6A, the PAN coordinator selects one of its antennas at step 602, performs an active scan for neighboring nodes at step 604, and obtains a list of neighboring nodes at step 606. This could occur in the same or similar manner as in FIG. 5A. The number of neighboring nodes in the list is counted at step 608, and a determination is made whether any antennas in the antenna bank remain to be selected at step 610. If so, the process returns to step 602.

Otherwise, the PAN coordinator determines whether at least one neighboring node was identified during any of the active scans at step 612. If so, the PAN coordinator determines which antenna or antennas have the largest neighbor list(s) at step 614. If one antenna has the largest neighbor list, that antenna is selected as the PAN coordinator's broadcast/multicast antenna at step 618.

If multiple antennas have neighbor lists with the largest size, those antennas are placed into an antenna list at step 620. Following either the "no" path from step 612 or step 620, the PAN coordinator chooses an antenna from an antenna list at step 622. If coming from step 612, the antenna list could include all antennas 210 in the PAN coordinator's antenna bank 208. If coming from step 620, the antenna list could include all antennas 210 inserted into the list at step 620. An energy detection scan is performed using the selected antenna at step 624. The energy detection scan could measure incoming energy captured using the selected antenna. A decision is made whether additional antennas remain to the selected from the antenna list at step 626, and if so the process returns to step 622. Otherwise, the average energy captured with each antenna is identified at step 628, and the antenna with the highest average energy is selected as the broadcast/multicast antenna at step 630.

Once a wireless device 200 has selected an antenna 210 as a unicast antenna for each neighboring node and an antenna 210 as a broadcast/multicast antenna, the wireless device 200 uses those selected antennas to communicate over the wireless network 100. During this time, communications could include the following features:

All broadcast/multicast transmissions can be made using the selected broadcast/multicast antenna.

The broadcast/multicast antenna can be used for transmitting messages or acknowledgements to nodes for which a unicast antenna selection has not yet been made.

The broadcast/multicast antenna can be chosen if a receiver in a wireless radio is kept on when idle.

All unicast transmissions to a neighboring medium access control (MAC) destination and all receptions from expected MAC sources (those assigned a unicast antenna) can occur using the unicast antenna chosen for that source or destination.

The same antenna selected for transmission can be kept enabled for receiving an acknowledgement. MAC acknowledgements to a node can be sent using the antenna selected for that node.

After sending a broadcast message, the transmit broadcast/multicast flag of all nodes can be set.

After sending a multicast message, the broadcast/multicast flag of all nodes that are part of the multicast group can be set.

The transmit broadcast/multicast flag corresponding to a node can be reset upon sending a unicast message to that node.

The receive broadcast/multicast flag or counter for a node can be incremented after receiving a broadcast or multicast message from that node.

The receive broadcast/multicast flag or counter for a node can be reset upon receiving a unicast message from that node.

The receive link quality for a node can be updated upon the reception of any message from that node. If the message is unicast, the receive link quality against the unicast antenna is updated. If the message is broadcast or multicast, the receive link quality against the broadcast/multicast antenna is updated.

The transmit link cost to a neighboring node is updated upon the reception of a link status message from that neighboring node. The receive cost in the link status message against the node that received the link status message is used as the transmit cost for the received node towards the node that transmitted link status message. When receiving a link status message from a neighboring node, if the transmit broadcast/multicast flag is set for that neighboring node, the transmit link quality of the broadcast/multicast antenna for that neighboring node is updated. If the transmit broadcast/multicast flag against that neighboring node is not set, the transmit link quality of the unicast antenna for that neighboring node is updated.

While transmitting a link status message, the transmit link cost and the receive link cost for every neighboring node can be based on the receive broadcast/multicast flag for each neighboring node, unless the age of the assigned antenna exceeds an age-out limit (in which case both transmit and receive link quality can be set to zero). If the receive broadcast/multicast flag is not set, the transmit link cost can be taken from the unicast antenna's transmit cost, and the receive link cost can be calculated from the receive link quality of the unicast antenna. If the receive broadcast/multicast flag is set, the transmit link cost can be taken from the broadcast/multicast antenna's transmit cost, and the receive link cost can be calculated from the receive link quality of the broadcast/multicast antenna.

At some point during operation of a wireless device 200, it may become necessary or desirable to change the unicast and/or broadcast/multicast antenna selected by that wireless device 200. This may be needed, for example, to account for changes in wireless channel conditions or movement of the wireless device 200 or its neighbors.

Figure 7:
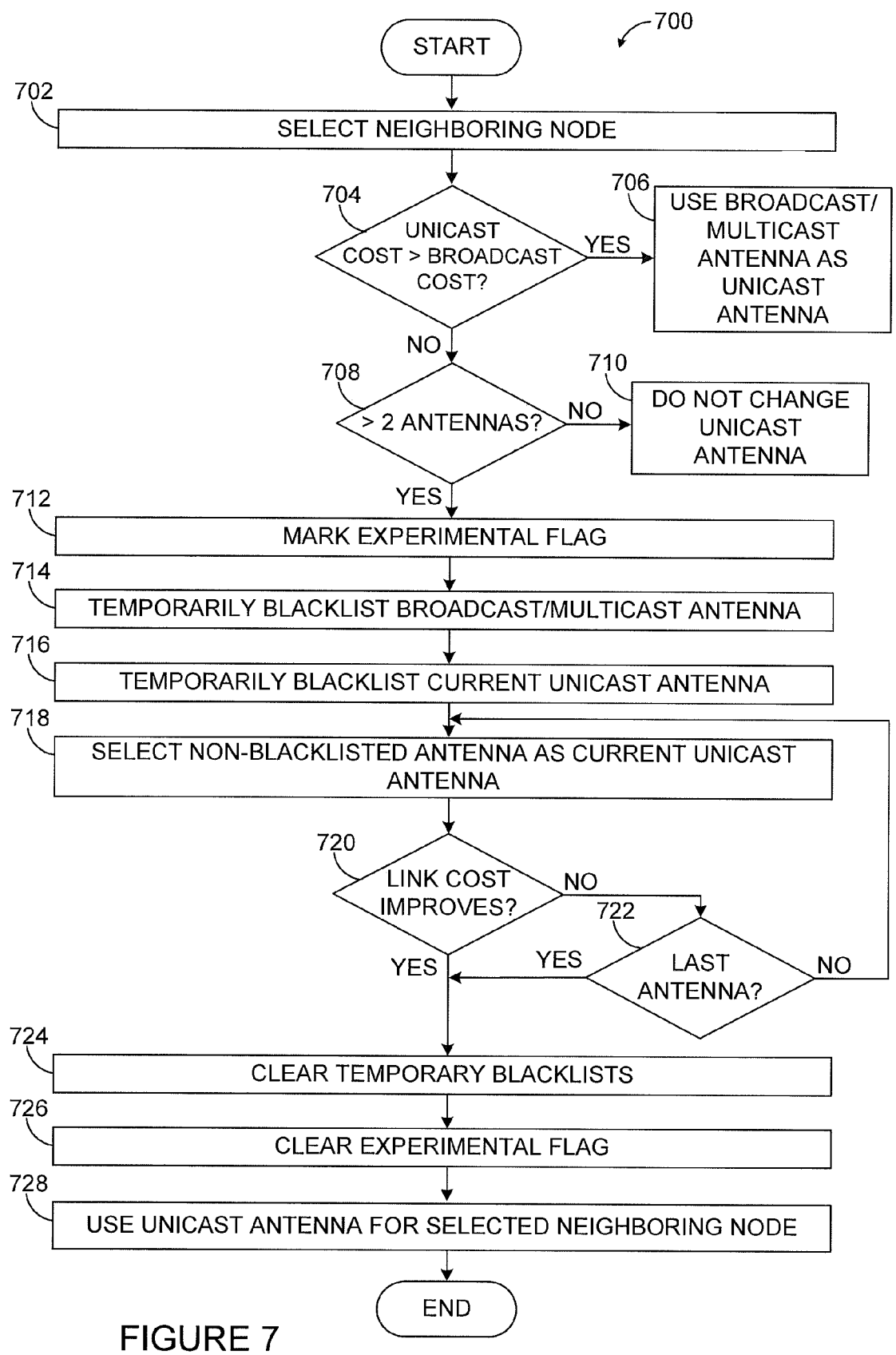

FIG. 7 illustrates an example method 700 for changing the unicast antenna used to communicate with a neighboring node. The method 700 could be used by the PAN coordinator, a FFD, or an RFD.

As shown in FIG. 7, the method 700 includes a wireless device selecting one of its known neighboring nodes for which a unicast antenna may need to be changed (either periodically or if the link cost to the neighboring node has increased) at step 702. A determination is made whether the wireless device's broadcast/multicast antenna has a better link cost to the selected neighboring node than the unicast antenna for that neighboring node at step 704. If so, the wireless device's broadcast/multicast antenna is selected as the unicast antenna for the neighboring node at step 706. At this point, the broadcast/multicast transmit link cost can be copied as the unicast transmit link cost for the selected neighboring node, and the broadcast/multicast receive link quality can be copied to the unicast receive link quality for the neighboring node. Otherwise, a determination is made whether there are only two antennas in the wireless device's antenna bank at step 708. If so, the unicast antenna for the selected neighboring node is not changed at step 710. Here, the wireless device only has two antennas (the current unicast antenna and the current broadcast/multicast antenna), and it has already been determined that the current unicast antenna has a better link quality than the current broadcast/multicast antenna.

If there are more than two antennas, the experimental antenna flag in the wireless device is marked at step 712. More specifically, the experimental antenna flag in the data structure(s) associated with the selected neighboring node is marked. Also, the current broadcast/multicast antenna of the wireless device is temporarily blacklisted at step 714, and the current unicast antenna for communicating with the selected neighbor is temporarily blacklisted at step 716. This could include, for example, adding the current broadcast/multicast and unicast antennas to a list or otherwise indicating that they cannot be selected during later steps.

At this point, a non-blacklisted antenna is selected at step 718. Any suitable criteria could be used to select a non-blacklisted antenna, such as by selecting a random non-blacklisted antenna or by selecting the non-blacklisted antenna that is used for unicast communications with the largest number of neighboring nodes. When the new antenna is selected, the link quality entries for that antenna can be cleared. A determination is made whether the link cost for communicating with the selected neighboring node improves using the selected non-blacklisted antenna at step 720. This could include, for example, the wireless device 200 communicating with the selected neighboring node and collecting link quality and link cost information. If the link cost does not improve and at least one non-blacklisted antenna remains to be selected at step 722, the process returns to step 718 to select another antenna.

If the link cost has improved or no antennas result in an improved link cost, the temporary blacklists are cleared at step 724, and the experimental antenna flag is cleared at step 726. A unicast antenna is selected for the selected neighboring node at step 728. If any antenna resulted in an improved link cost, that antenna is selected as the unicast antenna for the selected neighbor. If no antenna resulted in an improved link cost, the prior unicast antenna used to communicate with the selected neighbor is re-selected.

The method 700 could be performed at any suitable time, such as in response to a triggering event. Example triggering events include:

the transmit link cost of a currently-selected unicast antenna for a neighboring node becoming higher;

a failure to receive an acknowledgement for a unicast message requiring acknowledgement;

reception of a maximum number of consecutive messages with same MAC sequence number from the same neighboring node despite sending an acknowledgement (meaning the neighboring node is attempting to retransmit the same message because it did not receive the acknowledgement);

detection of a new neighboring node; and upon a periodical basis

Figure 8:
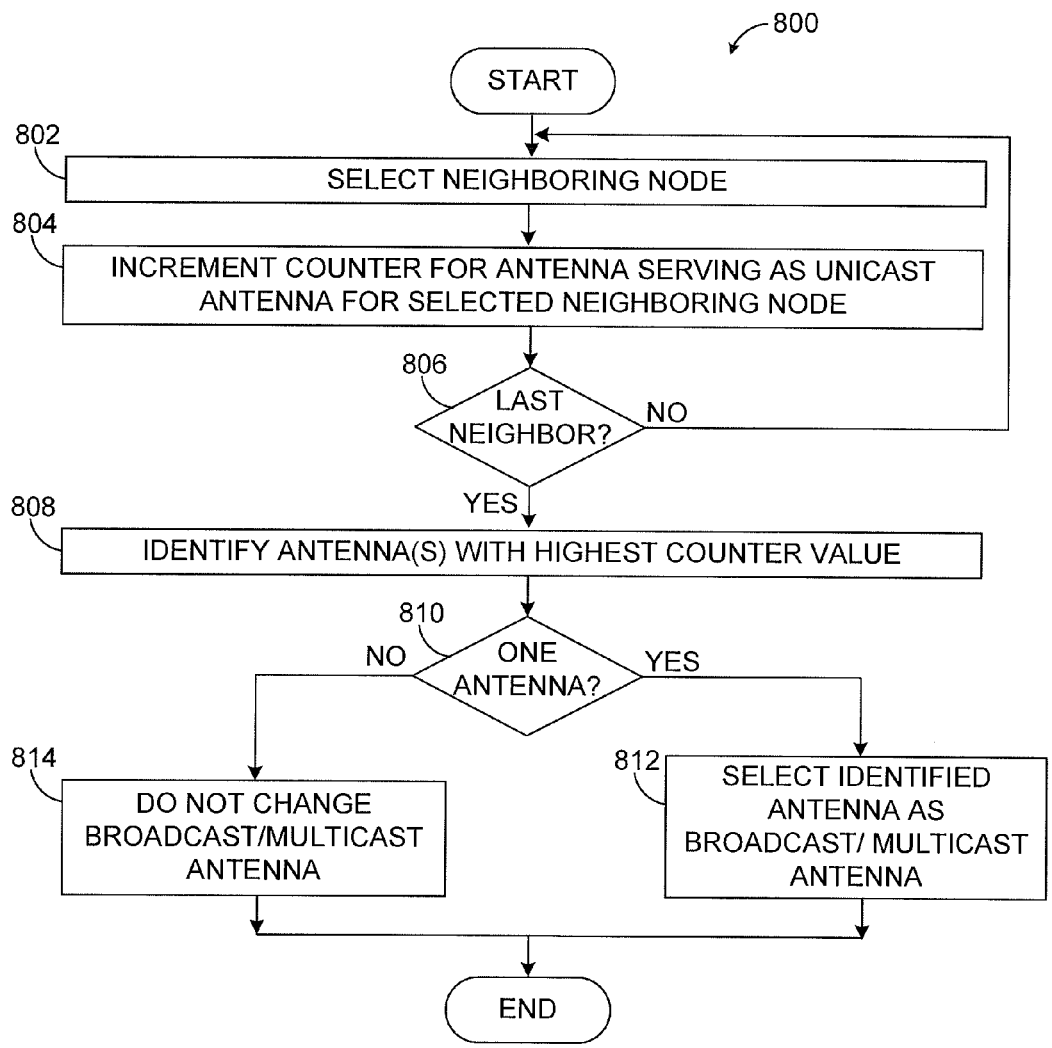

FIG. 8 illustrates an example method 800 for changing the broadcast/multicast antenna used to communicate with neighboring nodes. The method 800 could be used by the PAN coordinator, a FFD, or an RFD.

As shown in FIG. 8, a neighboring node is selected at step 802, and a counter for the selected neighboring node's unicast antenna is incremented at step 804. A decision is made whether any neighboring nodes remain to be selected at step 806, and if so the process returns to step 802. Otherwise, the antenna(s) having the highest counter value is/are identified at step 808.

A decision is made whether a single antenna has the highest counter value at step 810. If so, that single antenna is selected as the new broadcast/multicast antenna at step 812. After changing the broadcast/multicast antenna, the link quality details for the broadcast/multicast antenna for all neighboring nodes can be cleared. Otherwise, if multiple antennas are identified, no change is made to the broadcast/multicast antenna at step 814. In this case, it is assumed that the prior broadcast/multicast antenna remains as one of the antennas having the highest counter value. However, a check could also be made at step 814 seeing whether the prior broadcast/multicast antenna still shares the highest counter value, and a different broadcast/multicast antenna could be selected if not.

The method 800 could be performed at any suitable time, such as in response to a triggering event. Example triggering events include a change in the unicast antenna for one or more of the neighboring nodes.

Figure 9:
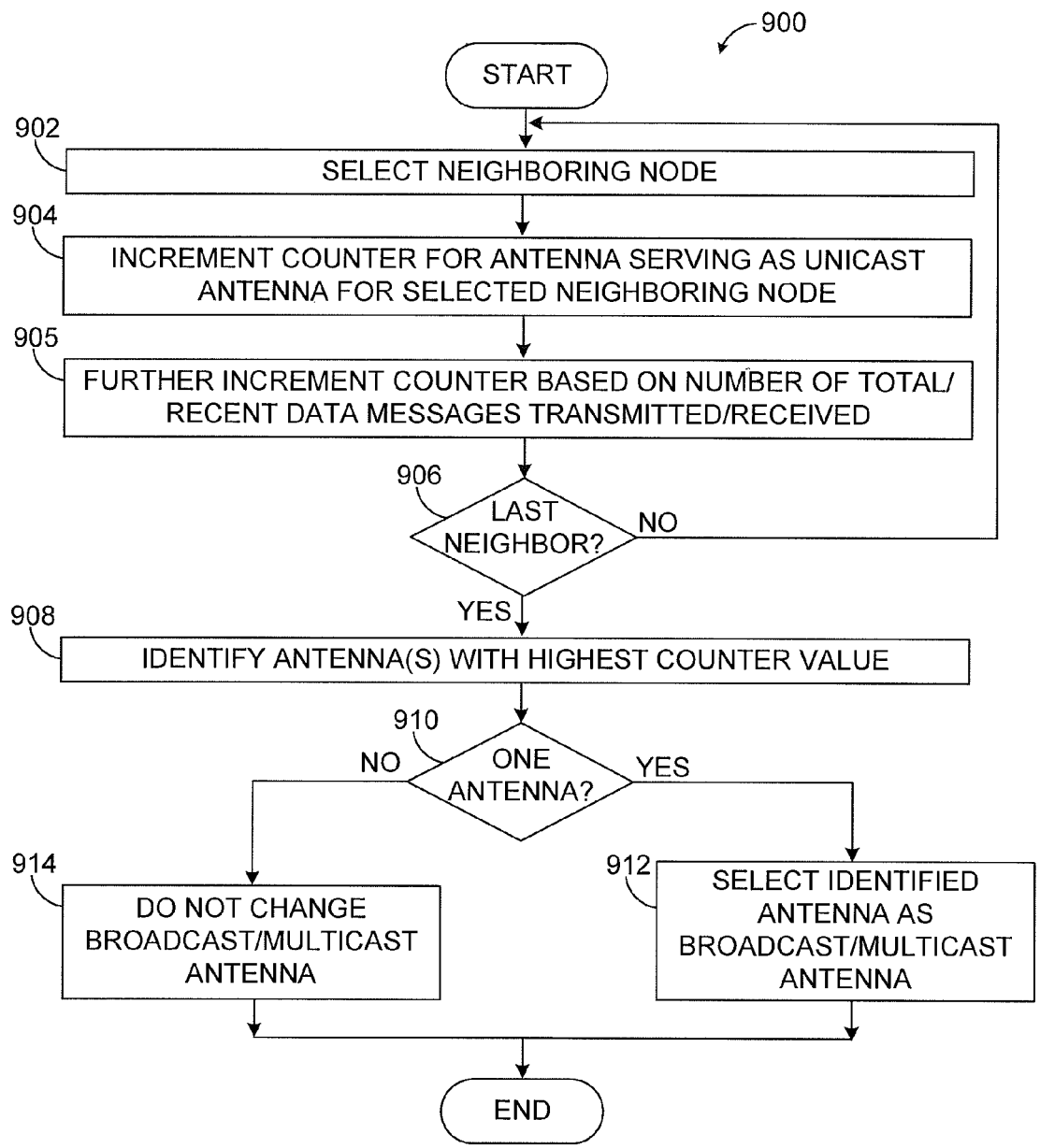

FIG. 9 illustrates another example method 900 for changing the broadcast/multicast antenna used to communicate with neighboring nodes. The method 900 could be used by the PAN coordinator, a FFD, or an RFD.

The method 900 here is similar to the method 800 of FIG. 8, where the steps 902-914 may be the same as or similar to the steps 802-814. However, the method 900 includes an additional step 905 in which the counter value for a selected neighboring node's antenna is incremented based on the number of total or recent data messages transmitted to and/or received from that neighboring node. In effect, this allows an increased frequency of transmissions to or receptions from a neighboring node using a non-broadcast antenna to trigger a change in the broadcast/multicast antenna. In this case, a higher weight is assigned to an antenna that is frequently used in a given time period, such as in a recent time window or during all time windows since power-up.

Although FIGS. 5A through 9 illustrate examples of methods for antenna selection diversity in a wireless ZigBee device, various changes may be made to FIGS. 5A through 9. For example, while shown as a series of steps, various steps in each figure could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    identifying, at a wireless device, transmit and receive link costs respectively associated with transmitting data to and receiving data from neighboring nodes of the wireless device; and
    selecting at least one of multiple antennas to be used to further communicate with the neighboring nodes, wherein the at least one antenna is selected using the transmit and receive link costs;
    wherein at least some of the transmit link costs are identified based on link qualities determined pursuant to a ZigBee standard and received at the wireless device as part of link status messages from the neighboring nodes; and
    wherein selecting the at least one antenna comprises:
        for each neighboring node, selecting one of the antennas as a unicast antenna for unicast communications with that neighboring node; and
        selecting one of the antennas as a broadcast/multicast antenna for broadcast or multicast communications with multiple neighboring nodes, the selected broadcast/multicast antenna representing the unicast antenna selected for a largest number of neighboring nodes.

2. The method of claim 1, wherein the method further comprises:
    receiving additional data from each neighboring node using the unicast antenna for that neighboring node; and
    sending one or more acknowledgements to each neighboring node using the unicast antenna for that neighboring node.

3. A method comprising:
    identifying, at a wireless device, transmit and receive link costs respectively associated with transmitting data to and receiving data from neighboring nodes of the wireless device; and
    selecting at least one of multiple antennas to be used to further communicate with the neighboring nodes, wherein the at least one antenna is selected using the transmit and receive link costs;
    wherein at least some of the transmit link costs are identified using link status messages received from the neighboring nodes;
    wherein selecting the at least one antenna comprises:
        for each neighboring node, selecting one of the antennas as a unicast antenna for unicast communications with that neighboring node; and
        selecting one of the antennas as a broadcast/multicast antenna for broadcast or multicast communications with multiple neighboring nodes, the selected broadcast/multicast antenna representing the unicast antenna selected for a lamest number of neighboring nodes; and
    wherein the method further comprises using the broadcast/multicast antenna to communicate with at least one additional neighboring node for which no unicast antenna has been selected.

4. The method of claim 1, further comprising:
    repeating the identifying and selecting steps to dynamically change the at least one antenna used to communicate with the neighboring nodes.

5. The method of claim 1, wherein an identity of the at least one antenna selected to communicate with the neighboring nodes is not communicated from the wireless device.

6. The method of claim 1, wherein:
    the transmit link cost associated with transmitting data to one neighboring node is identified using a receive cost contained in the link status message from that neighboring node, the receive cost based on the link quality during receipt of the transmitted data at that neighboring node; and
    the receive link cost associated with receiving data from one neighboring node is identified using a link quality measured during receipt of the received data from that neighboring node.

7. The method of claim 1, wherein the wireless device and the neighboring nodes comprise ZigBee devices.

8. An apparatus comprising:
    multiple antennas;
    a wireless radio configured to transmit data to and receive data from neighboring nodes using the antennas; and
    a controller configured to:
        identify transmit and receive link costs respectively associated with transmitting the data to and receiving the data from the neighboring nodes; and
        select at least one of the antennas to be used to further communicate with the neighboring nodes using the transmit and receive link costs;
    wherein the controller is configured to identify at least some of the transmit link costs based on link qualities determined pursuant to a ZigBee standard and received at the apparatus as part of link status messages from the neighboring nodes; and
    wherein the controller is configured to select the at least one antenna by:

for each neighboring node, selecting one of the antennas as a unicast antenna for unicast communications with that neighboring node; and selecting one of the antennas as a broadcast/multicast antenna for broadcast or multicast communications with multiple neighboring nodes, the selected broadcast/multicast antenna representing the unicast antenna selected for a largest number of neighboring nodes.

9. The apparatus of claim 8, wherein the controller is further configured to track whether a most recent data message received from each neighboring node is unicast or broadcast/multicast.

10. The apparatus of claim 9, wherein the controller is configured to track whether the most recent data message received from each neighboring node is unicast or broadcast/multicast in order to associate a next link status message from each neighboring node with one of: the unicast antenna for that neighboring node and the broadcast/multicast antenna.

11. The apparatus of claim 8, wherein the controller is configured to store the link qualities that are associated with transmissions and receptions using the unicast antennas separately from the link qualities that are associated with transmissions and receptions using the broadcast/multicast antenna.

12. The apparatus of claim 8, wherein the controller is configured to count a number of data messages received from each neighboring node and to use the counted number of data messages during selection of the broadcast/multicast antenna.

13. The apparatus of claim 8, further comprising:
one or more antenna switches configured to selectively couple different antennas to the wireless radio.

14. A non-transitory computer readable medium embodying a computer program, the computer program comprising computer readable program code for:
identifying, at a wireless device, transmit and receive link costs respectively associated with transmitting data to and receiving data from neighboring nodes of the wireless device; and
selecting at least one of multiple antennas to be used to further communicate with the neighboring nodes using the transmit and receive link costs;
wherein the computer readable program code for identifying the transmit and receive link costs comprises computer readable program code for identifying at least some of the transmit link costs based on link qualities determined pursuant to a ZigBee standard and received at the wireless device as part of link status messages from the neighboring nodes; and
wherein the computer readable program code for selecting the at least one antenna comprises computer readable program code for:
for each neighboring node, selecting one of the antennas as a unicast antenna for unicast communications with that neighboring node; and
selecting one of the antennas as a broadcast/multicast antenna for broadcast or multicast communications with multiple neighboring nodes, the selected broadcast/multicast antenna representing the unicast antenna selected for a largest number of neighboring nodes.

15. The non-transitory computer readable medium of claim 14, wherein the computer readable program code for selecting the at least one antenna further comprises computer readable program code for:
selecting, for each of at least one neighboring node, a different one of the antennas having a better link quality as a new unicast antenna for unicast communications with that neighboring node.

16. A non-transitory computer readable medium embodying a computer program, the computer program comprising computer readable program code for:
identifying, at a wireless device, transmit and receive link costs respectively associated with transmitting data to and receiving data from neighboring nodes of the wireless device; and
selecting at least one of multiple antennas to be used to further communicate with the neighboring nodes using the transmit and receive link costs;
wherein the computer readable program code for identifying the transmit and receive link costs comprises computer readable program code for identifying at least some of the transmit link costs using link status messages from the neighboring nodes;
wherein the computer readable program code for selecting the at least one antenna comprises computer readable program code for selecting one of the antennas as a broadcast/multicast antenna for broadcast or multicast communications with multiple neighboring nodes; and
wherein the computer program further comprises computer readable program code for selecting a different one of the antennas as the broadcast/multicast antenna using weights associated with the antennas, the weights based on a number of messages transmitted to or received from the neighboring nodes.

17. The non-transitory computer readable medium of claim 14, wherein the computer program further comprises computer readable program code for:
identifying the neighboring nodes using beacon messages from the neighboring nodes; and
selecting one of the neighboring nodes as a join node for the wireless device.

18. The method of claim 1, wherein the link status messages comprise link status messages periodically received from the neighboring nodes.

19. The non-transitory computer readable medium of claim 16, wherein the computer readable program code for selecting the at least one antenna comprises computer readable program code for:
for each neighboring node, selecting one of the antennas as a unicast antenna for unicast communications with that neighboring node.

20. The method of claim 1, further comprising:
selecting, for each of at least one neighboring node, a different one of the antennas having a better link quality as a new unicast antenna for unicast communications with that neighboring node.

21. A method comprising:
identifying, at a wireless device, transmit and receive link costs respectively associated with transmitting data to and receiving data from neighboring nodes of the wireless device; and
selecting at least one of multiple antennas to be used to further communicate with the neighboring nodes, wherein the at least one antenna is selected using the transmit and receive link costs;
wherein at least some of the transmit link costs are identified using link status messages received from the neighboring nodes;
wherein selecting the at least one antenna comprises selecting one of the antennas as a broadcast/multicast antenna for broadcast or multicast communications with multiple neighboring nodes; and wherein the method further comprises selecting a different one of the antennas as the broadcast/multicast antenna using weights associated with the antennas, the weights based on a number of messages transmitted to or received from the neighboring nodes.

22. The apparatus of claim 8, wherein the controller is further configured to select, for each of at least one neighboring node, a different one of the antennas having a better link quality as a new unicast antenna for unicast communications with that neighboring node.

23. An apparatus comprising:
multiple antennas;
a wireless radio configured to transmit data to and receive data from neighboring nodes using the antennas; and
a controller configured to:
identify transmit and receive link costs respectively associated with transmitting the data to and receiving the data from the neighboring nodes; and
select at least one of the antennas to be used to further communicate with the neighboring nodes using the transmit and receive link costs;
wherein the controller is configured to identify at least some of the transmit link costs using link status messages from the neighboring nodes;
wherein the controller is configured to select the at least one antenna by selecting one of the antennas as a broadcast/multicast antenna for broadcast or multicast communications with multiple neighboring nodes; and
wherein the controller is further configured to select a different one of the antennas as the broadcast/multicast antenna using weights associated with the antennas, the weights based on a number of messages transmitted to or received from the neighboring nodes.

24. An apparatus comprising:
multiple antennas;
a wireless radio configured to transmit data to and receive data from neighboring nodes using the antennas; and
a controller configured to:
identify transmit and receive link costs respectively associated with transmitting the data to and receiving the data from the neighboring nodes; and
select at least one of the antennas to be used to further communicate with the neighboring nodes using the transmit and receive link costs;
wherein the controller is configured to identify at least some of the transmit link costs using link status messages from the neighboring nodes;
wherein the controller is configured to select the at least one antenna by:
for each neighboring node, selecting one of the antennas as a unicast antenna for unicast communications with that neighboring node; and
selecting one of the antennas as a broadcast/multicast antenna for broadcast or multicast communications with multiple neighboring nodes, the selected broadcast/multicast antenna representing the unicast antenna selected for a lamest number of neighboring nodes; and
wherein the wireless radio is configured to use the broadcast/multicast antenna to communicate with at least one additional neighboring node for which no unicast antenna has been selected.

* * * * *